United States Patent
Chen

(10) Patent No.: US 6,870,721 B2
(45) Date of Patent: Mar. 22, 2005

(54) APPARATUS FOR POWER SOURCE PROTECTION WITH AUTOMATIC LATCH-OFF

(75) Inventor: Tsung-Ta Chen, Lujou (TW)

(73) Assignee: Quanta Computer Inc., Tao Yuan Shien (TW)

( * ) Notice: Subject to any disclaimer, the term of this patent is extended or adjusted under 35 U.S.C. 154(b) by 279 days.

(21) Appl. No.: 10/317,098

(22) Filed: Dec. 12, 2002

(65) Prior Publication Data

US 2003/0218845 A1 Nov. 27, 2003

(30) Foreign Application Priority Data

May 24, 2002 (TW) ........................................ 91111144 A

(51) Int. Cl.[7] .............................................. H02H 3/14
(52) U.S. Cl. ........................................ 361/88; 361/93.1
(58) Field of Search ........................ 361/92, 88, 93.1, 361/52

(56) References Cited

U.S. PATENT DOCUMENTS

| | | | | |
|---|---|---|---|---|
| 4,771,357 A | * | 9/1988 | Lorincz et al. ............... | 361/87 |
| 5,424,894 A | * | 6/1995 | Briscall et al. ............... | 361/45 |
| 5,723,916 A | * | 3/1998 | Disney et al. ............... | 307/131 |
| 5,745,327 A | * | 4/1998 | Choo .......................... | 361/111 |
| 5,757,599 A | * | 5/1998 | Crane .......................... | 361/56 |
| 6,208,042 B1 | * | 3/2001 | Solis .......................... | 307/125 |

* cited by examiner

Primary Examiner—Brian Sirous
Assistant Examiner—James A Demakis
(74) Attorney, Agent, or Firm—Rabin & Berdo, P.C.

(57) ABSTRACT

An apparatus for power source protection with automatic latch-off is provided for use in an electronic apparatus. The electronic apparatus includes a power supply and a main functional circuit, such as a notebook computer. The power supply is coupled to the main functional circuit via an electronic switching device, so as to power the main functional circuit via a power source terminal of the electronic switching device. The apparatus for power source protection with automatic latch-off includes a low-voltage-triggered latch-off device and a low-voltage-triggered responding device. The low-voltage-triggered latch-off device is coupled to the electronic switching device, so as to control the on or off state of the electronic switching device. The low-voltage-triggered responding device is coupled to the power source terminal and the low-voltage-triggered latch-off device. When a short circuit occurs, the low-voltage-triggered responding device can enable the latch-off device to turn off the electronic switching device, so as to cut off the power supply to the main functional circuit.

20 Claims, 2 Drawing Sheets

APPARATUS FOR POWER SOURCE PROTECTION WITH AUTOMATIC LATCH-OFF

This application incorporates by reference Taiwan application Serial No. 091111144, filed on May 24, 2002.

BACKGROUND OF THE INVENTION

1. Field of the Invention

The invention relates to a circuit protection apparatus, and more particularly to an over-current protection apparatus.

2. Description of Related Art

In recent years, electronic devices have achieved higher precision and complexity so that a stable power source becomes more important. Take the power source for the notebook computer for example, the arrangement of the power source includes an internal rechargeable battery and a connection to an external power supply. This arrangement allows the notebook computer to use the public electric power as the power source and, at the same time, to charge the rechargeable battery for use when no public electric power is available to the notebook computer.

Referring to FIG. 1, a conventional approach to supplying power to an electronic device is schematically illustrated. Take a notebook computer as an example of the electronic device. A power supply 11 is an external power source (other than the rechargeable battery) for the notebook computer. The main functional circuit 12 represents the circuit for implementing the function of the notebook computer. The power supply 11 is coupled to the main functional circuit 12 via the electronic switch and so as to supply the electric power to the main functional circuit 12, wherein the electronic switch can be a transistor. The transistor can be a bipolar junction transistor (BJT) or a metal oxide semiconductor field effect transistor (MOSFET or MOS), such as an N-type MOS (NMOS) transistor or P-type MOS (PMOS) transistor. In FIG. 1, the electric switch is an NMOS Q, for example. With respect to the NMOS Q, the source electrode can be used as a power source terminal Vin. When the power supply 11 is connected to the notebook computer, the gate electrode of the NMOS Q can be coupled to a high voltage VH of the power supply 11 via a resistor R, so as to turn on the NMOS Q. In this manner, the main functional circuit 12 can obtain the electric power generated by the power supply 11 via the power source terminal Vin.

When a short circuit occurs inside the computer due to unknown reasons, according to the usual design for the power supply, the power supply 11 will perform automatic power cut-off. Unfortunately, the effective value of the short-circuit current is of a certain amount. Thus, a high temperature would occur inside the computer because the amount of the short-circuit current is too large or the short-circuit current exists for a long time. This would cause damage to the electronic parts or even to the whole main board in the worst case.

When the short circuit occurs inside the computer, all power will be brought down to a low voltage level of about zero. In this case, no power source inside the computer system is available to activate the over current protection circuit. For the current situation, when the notebook computer does not work due to the occurrence of a short circuit, the short-circuit current is typically at least 2 to 4 ampere (A). In particular, the power supply for P4 CPU will consume the electric power of at least 80 watt (W). For this reason, the value of the short-circuit current may be as large as about 5 ampere (A). This large short-circuit current would cause serious damage to the computer system.

The conventional methods to solve the damage of a short circuit fall into two categories. One is to reduce the effective current values generated by the power supply due to the occurrence of the external short circuit. The other is to increase the power and current tolerance of the electronic switching device. With respect to the first method, as the operating frequency of the CPU implemented by the notebook computer grows faster and faster, the power consumption for the computer system will grow accordingly also. Then, the power from the power supply must be at a sufficient level for use. In this situation, the goal of reducing the level of a short-circuit current is not easy to achieve. With respect to the second solution, although the electronic switching device with the capability for enduring the large current and the high power can temporarily prevent the system from being damaged by the high temperature, the short circuit failure is not solved yet and the short-circuit current remains. After a long period, the electronic parts or the main board still could be damaged in the end. This second method only postpones the occurring time of damage, and cannot avoid damage due to the short circuit. Furthermore, the fabrication cost is high for the electronic switching device capable of enduring the large current and the high power, resulting in a high cost of the power protection design.

SUMMARY OF THE INVENTION

It is therefore an objective of the invention to provide an apparatus for power source protection with automatic latch-off, which can turn off the power supply in time when a short circuit occurs in the computer system, so that the short-circuit current can be reduced and the damage to the electronic parts or device can be prevented.

In accordance with the foregoing and other objectives of the invention, the invention provides an apparatus for power source protection with automatic latch-off. The apparatus is briefly described as follows:

The apparatus for power source protection with automatic latch-off can be used in an electronic apparatus. The electronic apparatus includes a power supply and a main functional circuit. The power supply can be coupled to the main functional circuit via an electronic switching device, so that the main functional circuit can receive the needed operation power via a power source terminal of the electronic switching device. The apparatus for power source protection with automatic latch-off includes a low-voltage-triggered latch-off device and a low-voltage-triggered responding device. The low-voltage-triggered latch-off device is coupled to the electronic switching device, and is used for controlling the on or off state of the electronic switching device. The low-voltage-triggered responding device is coupled to the power source terminal and the low-voltage-triggered latch-off device. When the power source terminal is short-circuited, the low-voltage-triggered responding device enables the low-voltage-triggered latch-off device to turn off the electronic switching device, so as to cut off the supply of power to the main functional circuit.

The low-voltage-triggered responding device includes a bias device and a transistor switching device and the low-voltage-triggered latch-off device includes a latch-off device and a power storage device, wherein the latch-off device can control the electronic switching device to open or close. The bias device biases the transistor switching device to open by dividing the voltage at the power source terminal so as to enable the transistor switching device to close the latch-off device. As a result, the electronic switching device can remain in the on state. On the other hand, the power storage device stores energy while the main functional circuit operates under normal condition. When a short circuit occurs, the transistor switching device will not be biased sufficiently and will be turned off then. At this moment, the power storage device can activate the latch-off device with the energy stored so that the latch-off device can turn off the electronic switching device so as to prevent the short-circuit current.

In the practical applications, the latch-off device can be implemented by using a transistor switching device. The power storage device can be an RC circuit, so as to use the capacitor to store the energy sufficient for activating the latch-off device when necessary.

Other objects, features, and advantages of the invention will become apparent from the following detailed description of the preferred but non-limiting embodiments. The following description is made with reference to the accompanying drawings.

DETAILED DESCRIPTION OF PREFERRED EMBODIMENTS

Figure 1:
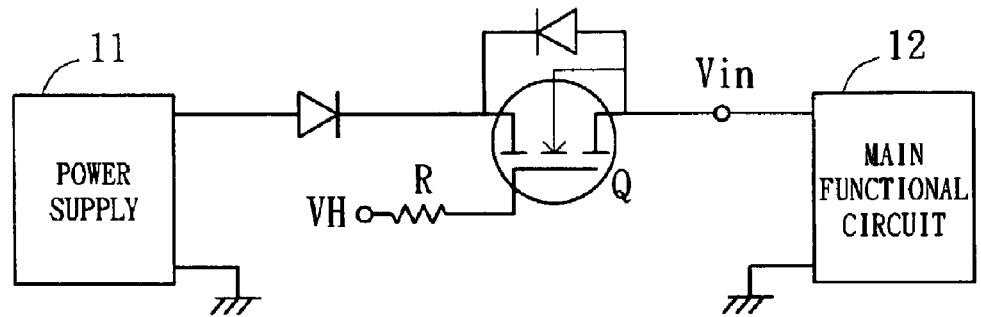
FIG. 1 (Prior Art) schematically illustrates a conventional approach to supplying power to an electronic apparatus.
Figure 2:
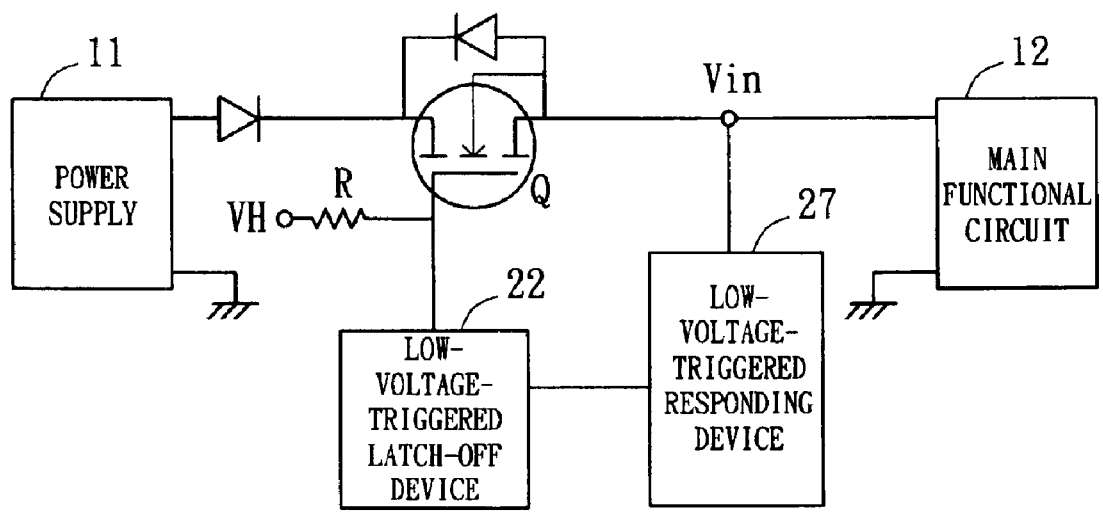
FIG. 2 is a block diagram illustrating an apparatus for power source protection with automatic latch-off according to a preferred embodiment of the invention.

In order to avoid the short-circuit current due to the occurrence of a short circuit in a main functional circuit, the power supply for the main functional circuit is cut off according to the invention when the short circuit occurs. When a short circuit occurs, the short-circuit current can be prevented by turning off an electronic switching device which acts as a bridge between the power supply 11 and the main functional circuit 12, such as the NMOS Q shown in FIG. 1. FIG. 2 illustrates an apparatus for power source protection with automatic latch-off according to a preferred embodiment of the invention. The apparatus for power source protection with automatic latch-off includes a low-voltage-triggered latch-off device 22 and a low-voltage-triggered responding device 27. The low-voltage-triggered latch-off device 22 is coupled to an NMOS Q of the electronic switching device, and is used to control the on or off state of the NMOS Q of the electronic switching device. The low-voltage-triggered responding device 27 is coupled to a power source terminal Vin and the low-voltage-triggered latch-off device 22. When the power source terminal Vin is in short circuit, the low-voltage-triggered responding device 27 can cause the low-voltage-triggered latch-off device 22 to turn off the NMOS Q. After the NMOS Q is turned off, the power supply 11 and the main functional circuit 12 are in the close status. The short-circuit current is automatically avoided in time because the main functional circuit 12 is not powered. Thus, damage to the system and the device parts due to the high temperature by the short circuit can be prevented.

Figure 3:
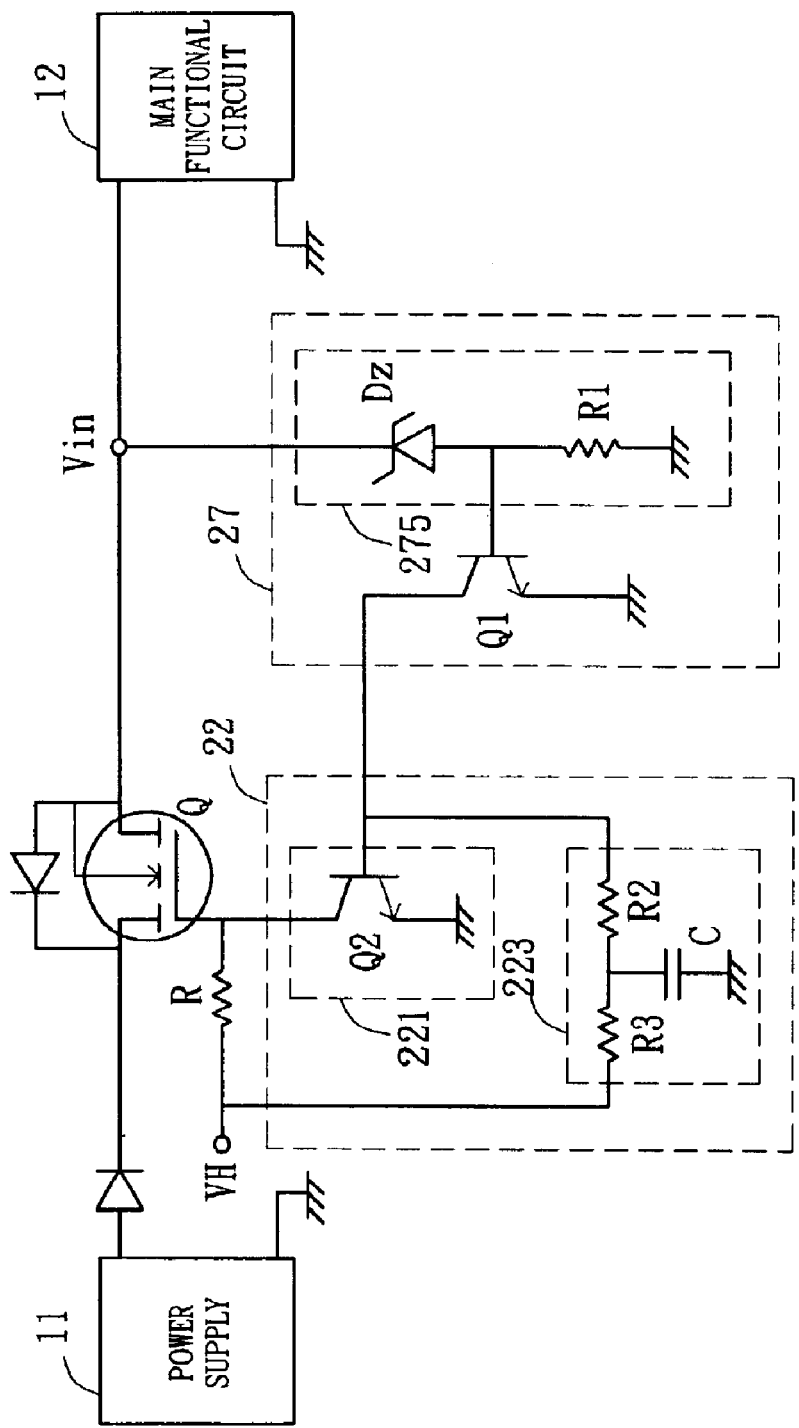
FIG. 3 shows the circuit structure of the low-voltage-triggered latch-off device and the low-voltage-triggered responding device in FIG. 2.

Referring to FIG. 3, the low-voltage-triggered latch-off device 22 and the low-voltage-triggered responding device 27 are illustrated. Assume the main functional circuit 12 in FIG. 3 represents a notebook computer with no failure with respect to short circuit, for example. If the power supply 11 is connected to the notebook computer, the gate electrode of the NMOS Q is then coupled to the high voltage VH via the resistor R to enable the NMOS Q to conduct current. As a result, the main functional circuit 12 obtains the needed power from the power source terminal Vin. In addition, the bias device 275 biases the transistor switching device Q1 by supplying the transistor switching device Q1 with a fraction of the power source terminal Vin through a resistor R1. In this situation, the voltage at the collector electrode of the transistor switching device Q1 is at a very low voltage of about 0.2 volts, for example, which is the voltage difference $V_{CE(saturation)}$ between the collector and the emitter of the transistor switching device Q1 at saturation, depending on the characteristic of Q1. In the practical applications, a proper bias device 275 can be designed according to the requirements, for example, to be composed of a Zener diode Dz and a resistor R1 coupled to the Zener diode Dz in series.

In FIG. 3, the low-voltage-triggered latch-off device 22 includes a latch-off device 221 and a power storage device 223. The latch-off device 221, for example, is a transistor switching device Q2 which is coupled to the NMOS Q, and is used to close the NMOS Q when a short circuit occurs in the main functional circuit 12. For the conventional design, no available power can be provided to turn on the protection circuit when a short circuit occurs in the main functional circuit 12 since the voltage at the power source terminal has been reduced to a very low level. In order to solve this issue, the design of the invention includes the power storage device 223, which can store energy beforehand while the main functional circuit 12 operates under the normal condition. When a short circuit occurs, the power storage device 223 can provide the energy to turn on the latch-off device 221 in time so that the latch-off device 221 can enable the NMOS Q to be off.

The power storage device 223, for example, is composed of resistors R2 and R3 and a capacitor C, so as to form an RC circuit, in which the resistance of the resistor R3 is much greater than the resistance of the resistor R2. As a result, it will take a long time to charge the capacitor C with the current flowing through resistor R3. The discharging of the capacitor C, on the other hand, is very fast through the resistor R2. When the main functional circuit 12, such as a notebook computer, in good condition is connected to the power supply 11, the transistor switching device Q1 will be saturated. Since the collector of the transistor switching device Q1 is coupled to the base of the transistor switching device Q2, the low voltage at the base of the transistor switching device Q1 causes the transistor switching device Q2 to be off. In addition, when the power supply 11 is coupled to the notebook computer, the high voltage VH will charge the capacitor C. It should be noted that since the charging speed is slow, the transistor switching device Q2 will have been turned off by the transistor switching device Q1 before the capacitor C is being charged to provide an accumulating voltage sufficient to turn on the transistor switching device Q2. Thus, the transistor switching device Q2 cannot be turned on in this case even if the energy stored in the capacitor C is increasing.

When a short circuit occurs, the power source terminal Vin is reduced to a very low level, causing the transistor switching device Q1 to be turned off since no sufficient bias is obtained. On the other hand, when the short circuit occurs at the power source terminal Vin, the voltage across the capacitor C is still sufficient to turn on the transistor switching device Q2 although the high voltage level VH will accordingly diminish. This is because the resistance of the resistor R3 is much greater than the resistance of the resistor R2 and therefore the discharging speed of the capacitor C via the resistor R3 is very slow. After the transistor switching device Q2 is turned on, the electronic switching device Q will be turned off since the gate electrode is grounded.

After the electronic switching device Q is turned off, the power supply 11 is electronically disconnected from the main functional circuit 12. The high voltage VH immediately returns to its original voltage level by the power supply 11 and continuously charges the capacitor C. Therefore, the transistor switching device Q2 remains in the on state, and the electronic switching device Q remains in the off state.

As indicated above, the low-voltage-triggered responding device 27 is included in order to enable the low-voltage-triggered latch-off device 22 in the event of a failure due to a short circuit. That is, the low-voltage-triggered latch-off device 22 is expected to have no effect under normal load conditions. Under normal load conditions, the power source terminal Vin causes the transistor switching device Q1 to be on and then to turn off the transistor switching device Q2, whereby the electronic switching device Q remains on. When a short circuit occurs at the power source terminal Vin or the voltage level is too low, the transistor switching device Q1 is turned off. In these conditions, the power storage device 223 turns on the transistor switching device Q2 with the energy stored in the power storage device 223 so as to turn off the electronic switching device Q. After the electronic switching device Q is turned off, the high voltage VH will return immediately, causing the power storage device 223 to be charged continuously and the transistor switching device Q2 is latched in the in conduction state. As a result, the electronic switching device Q will remain in the off state, so as to avoid the short-circuit current.

It should be noted that, although the bipolar junction transistor is used as an example of the transistor switching device in the detailed description, other kinds of transistor, such as the field effect transistor (FET) or MOSFET, and so on, can also be used as the transistor switching device.

In summary, the invention as described in the preferred embodiment has disclosed an apparatus for power source protection with automatic latch-off, which includes at least the following advantages:

1. When a short circuit occurs, the power supply is electronically disconnected from the main functional circuit immediately, so as to avoid the short-circuit current.

2. It is not necessary to change the design of the power supply and the tolerance level of the electronic switching device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for power source protection with automatic latch-off, for use in an electronic apparatus, the electronic apparatus including a power supply and an electronic switching device coupled to the power supply, wherein the electronic switching device has a power source terminal, and the electronic apparatus is powered through the power source terminal, the apparatus for power source protection with automatic latch-off comprising:

a low-voltage-triggered latch-off device, coupled to the electronic switching device, for turning off the electronic switching device when the power source terminal is short-circuited; and a low-voltage-triggered responding device, coupled to the power source terminal and the low-voltage-triggered latch-off device, wherein the low-voltage-triggered responding device enables the low-voltage-triggered latch-off device to turn off the electronic switching device when the power source terminal is short-circuited.

2. The apparatus for power source protection with automatic latch-off as recited in claim 1, wherein the electronic switching device is a transistor.

3. The apparatus for power source protection with automatic latch-off as recited in claim 2, wherein the transistor is a metal oxide semiconductor field effect transistor (MOSFET).

4. The apparatus for power source protection with automatic latch-off as recited in claim 3, wherein the metal oxide semiconductor field effect transistor is of N-type.

5. The apparatus for power source protection with automatic latch-off as recited in claim 3, wherein the metal oxide semiconductor field effect transistor is of P-type.

6. The apparatus for power source protection with automatic latch-off as recited in claim 1, wherein the low-voltage-triggered responding device comprises:

a transistor switching device, couple to the low-voltage-triggered latch-off device; and a biasing device, coupled to the transistor switching device and the power source terminal, for biasing the transistor switching device.

7. The apparatus for power source protection with automatic latch-off as recited in claim 6, wherein the biasing device includes a Zener diode and a resistor in series connection with the Zener diode.

8. The apparatus for power source protection with automatic latch-off as recited in claim 6, wherein the transistor switching device is a bipolar junction transistor (BJT).

9. An apparatus for power source protection with automatic latch-off, for use in an electronic apparatus, the electronic apparatus including a power supply and an electronic switching device coupled to the power supply, wherein the electronic switching device has a power source terminal, and the electronic apparatus can be powered through the power source terminal, the apparatus for power source protection with automatic latch-off comprising:

a latch-off device, coupled to the electronic switching device, for turning off the electronic switching device;

a power storage device, coupled to the latch-off device and the power supply, for storing energy so as to provide an activation power for activating the latch-off device; and a low-voltage responding device, coupled to the power source terminal and the power storage device, wherein the low-voltage responding device enables the activation power to be fed into the latch-off device, so as to turn off the electronic switching device when the power source terminal is short-circuited.

10. The apparatus for power source protection with automatic latch-off as recited in claim 9, wherein the latch-off device is a transistor switch.

11. The apparatus for power source protection with automatic latch-off as recited in claim 10, wherein the transistor is a bipolar junction transistor (BJT).

12. The apparatus for power source protection with automatic latch-off as recited in claim 9, wherein the power storage device is an RC circuit.

13. The apparatus for power source protection with automatic latch-off as recited in claim 9, wherein the electronic switching device is a transistor.

14. The apparatus for power source protection with automatic latch-off as recited in claim 13, wherein the transistor is a metal oxide semiconductor field effect transistor.

15. The apparatus for power source protection with automatic latch-off as recited in claim 14, wherein the metal oxide semiconductor field effect transistor is of N-type.

16. The apparatus for power source protection with automatic latch-off as recited in claim 14, wherein the metal oxide semiconductor field effect transistor is of P-type.

17. The apparatus for power source protection with automatic latch-off as recited in claim 9, wherein the responding device comprises:

a transistor switching device, coupled to the low-voltage-triggered latch-off device; and a biasing device, coupled to the transistor switching device and the power source terminal, for biasing the transistor switching device.

18. The apparatus for power source protection with automatic latch-off as recited in claim 17, wherein the biasing device includes a Zener diode and a resistor coupled to the Zener diode in series.

19. The apparatus for power source protection with automatic latch-off as recited in claim 17, wherein the transistor switching device is a bipolar junction transistor (BJT).

20. The apparatus for power source protection with automatic latch-off as recited in claim 9, wherein the electronic apparatus is a notebook computer.

* * * * *